United States Patent
Duprez et al.

(10) Patent No.: US 9,580,951 B2
(45) Date of Patent: Feb. 28, 2017

(54) BUFFER DEVICE HAVING A SELF-ADJUSTING ABUTMENT

(71) Applicant: A RAYMOND ET CIE, Grenoble (FR)

(72) Inventors: Remi Duprez, Gap (FR); Jean-Francois Albaran, Varces (FR); David Lamoureux, Grenoble (FR); Sylvain Giraud, Noyarey (FR)

(73) Assignee: A. RAYMOND ET CIE, Grenoble (FR)

(*) Notice: Subject to any disclaimer, the term of this patent is extended or adjusted under 35 U.S.C. 154(b) by 0 days.

(21) Appl. No.: 15/029,141

(22) PCT Filed: Oct. 10, 2014

(86) PCT No.: PCT/FR2014/052574
§ 371 (c)(1),
(2) Date: Apr. 13, 2016

(87) PCT Pub. No.: WO2015/055921
PCT Pub. Date: Apr. 23, 2015

(65) Prior Publication Data
US 2016/0245008 A1     Aug. 25, 2016

(30) Foreign Application Priority Data
Oct. 14, 2013 (FR) ..................................... 13 59978

(51) Int. Cl.
*E05F 5/02* (2006.01)
*B60J 5/10* (2006.01)

(52) U.S. Cl.
CPC .............. *E05F 5/022* (2013.01); *B60J 5/107* (2013.01); *E05Y 2900/548* (2013.01)

(58) Field of Classification Search
CPC ..... Y10T 16/61; Y10T 16/625; Y10T 16/628; Y10T 16/6285; E05F 5/00; E05F 5/003;
(Continued)

(56) References Cited

U.S. PATENT DOCUMENTS

| 4,924,549 A | * | 5/1990 | Morel ..................... E05F 5/022 16/82 |
| 5,092,550 A | * | 3/1992 | Bettini .................... E05F 5/022 248/188.4 |

(Continued)

FOREIGN PATENT DOCUMENTS

| CN | 1311843 A | 9/2001 |
| CN | 1473234 A | 2/2004 |

(Continued)

OTHER PUBLICATIONS

Chinese Office Action for CN Application No. 2014108562473.
International Search Report mailed Jan. 9, 2015.

*Primary Examiner* — Chuck Mah
(74) *Attorney, Agent, or Firm* — Dickinson Wright PLLC

(57) ABSTRACT

A buffer device with a self-adjustable stop comprises a buffer head (5) in the form of a shank presenting along its length a flat and touching ribs or grooves (6), and a socket (8) into which the buffer head in the form of a shank can be driven axially, serration by serration. The device further comprises an annular ring (7) inserted axially in an axial bore in said socket and presenting a bottom edge defining a thrust ramp. The ring has an inner surface presenting a smooth strip and an adjacent serrated strip such that actuating the ring by turning it causes the buffer head to be raised and its axial position to be blocked.

8 Claims, 5 Drawing Sheets

(58) Field of Classification Search
CPC ... E05F 5/006; E05F 5/02; E05F 5/022; E05F 5/06; F16F 1/44; F16F 1/445; F16F 1/3732; F16F 1/3735; B65G 69/001; B60G 2204/4502
See application file for complete search history.

(56) References Cited

U.S. PATENT DOCUMENTS

| | | | |
|---|---|---|---|
| 5,735,511 A | 4/1998 | Stocker et al. | |
| 6,088,878 A | 7/2000 | Antonucci et al. | |
| 6,119,306 A | 9/2000 | Antonucci et al. | |
| 6,261,042 B1 * | 7/2001 | Pratt | F16B 5/10 411/551 |
| 7,356,879 B2 * | 4/2008 | Dembowsky | F16B 5/0233 16/82 |
| 7,469,445 B2 * | 12/2008 | Dennis | E05F 5/022 16/82 |
| 8,056,965 B2 * | 11/2011 | Rosemann | E05F 5/022 16/86 A |
| 8,616,622 B2 * | 12/2013 | Davis | B60R 21/34 180/69.2 |
| 2002/0003993 A1 | 1/2002 | Ichimaru | |
| 2004/0025290 A1 | 2/2004 | Novarino | |
| 2004/0221424 A1 | 11/2004 | Matsuzawa | |
| 2009/0102218 A1 * | 4/2009 | Fernandez | F16F 13/14 296/35.1 |
| 2011/0030177 A1 * | 2/2011 | Ukai | F16B 21/086 24/458 |

FOREIGN PATENT DOCUMENTS

| | | | | |
|---|---|---|---|---|
| CN | 204283052 U | | 4/2015 | |
| DE | 29716111 U1 | * | 11/1997 | B60J 5/101 |
| EP | 0738838 A2 | | 10/1996 | |
| EP | 0892140 A2 | | 1/1999 | |
| JP | 2006051889 A | * | 2/2006 | |
| JP | 2006062633 A | * | 3/2006 | |
| JP | 2008094261 A | * | 4/2008 | |

* cited by examiner

BUFFER DEVICE HAVING A SELF-ADJUSTING ABUTMENT

This application is a 371 national phase entry of PCT/FR2014/052574, filed Oct. 10, 2014, which claims benefit of French Patent Application No. 1359978, filed Oct. 14, 2013, the entire contents of which are incorporated herein by reference for all purposes.

TECHNICAL FIELD

The invention relates to a buffer device with a self-adjustable stop, intended more particularly for supporting a first component on a second component, in particular a movable bodywork portion of a motor vehicle of the type comprising a rear trunk tailgate, a hood, a door, or a flap, on a stationary portion of the vehicle body.

RELATED ART

Patent document EP 0 892 140 discloses such a buffer device with a self-adjustable stop that comprises a buffer head in the form of a shank and a socket into which the buffer head in the form of a shank can be driven axially, serration by serration, the device further including blocking means that can be actuated to block the axial position in the socket of the buffer head in the form of a shank.

In general, assembling such a buffer device with a self-adjustable stop takes place in several stages.

In a first stage, the buffer head in the form of a shank is prepositioned and blocked in the socket by being inserted a short distance therein, i.e. it is not driven fully into it.

That assembly is then fastened, e.g. on the stationary portion of the rear trunk of a motor vehicle that has a rear trunk tailgate closing down thereon, for example.

Thereafter, the rear trunk tailgate is closed for a first time on the stationary portion of the rear trunk of the vehicle.

The buffer head then self-adjusts its axial position in the socket, i.e. it is driven into the socket serration by serration under the effect of the thrust force exerted by the trunk tailgate until it reaches a position in which it is flush with the now completely closed rear trunk tailgate.

The rear trunk tailgate is then opened. The buffer head in the form of a shank is then locked in axial position in the socket by operating blocking means so that the buffer head in the form of a shank can no longer penetrate into the socket and can thus constitute a stop on the next occasion the rear trunk tailgate is closed.

In that buffer device with a self-adjustable stop, the buffer head in the form of a shank presents along its outer peripheral surface a succession of touching annular ribs or grooves that are spaced apart in the axial direction of the shank.

The socket has a bore which likewise presents along the height of its inner surface a succession of touching annular ribs or grooves that are spaced apart along the axial direction of the bore, the ribs in the bore being for engaging between the ribs of the buffer head in the form of a shank, thereby having the effect of increasing friction forces, while nevertheless enabling relative movement to take place serration by serration.

In that buffer device with a self-adjustable stop, the blocking means that can be actuated to block the axial position of the buffer head in the socket comprise a self-tapping screw that runs axially through the shank of the buffer head, the shank being hollow inside.

Furthermore, the end of the shank of the buffer head that is driven into the socket is split in the axial direction in order to define flexible tabs that can be expanded radially so that when the screw is driven into the shank, it spaces the tabs of the shank apart radially and thereby clamps the shank in the socket by radial expansion, thus blocking the axial position of the buffer head in the socket.

The manufacturers of motor vehicles also desire to impart prestress in that type of buffer device with a self-adjustable stop so that on closing the rear trunk tailgate, for example, in the manner described above, there is an effect of the rear trunk tailgate being damped on the buffer head mounted on the stationary portion of the vehicle trunk.

For that purpose, in the above-specified patent document, proposals are made for a pad of calibrated thickness for engaging the stop to be mounted on the edge of the rear trunk tailgate.

Installing a buffer device with a self-adjustable stop as disclosed in the above-specified document thus comprises the following operations:

- the socket is fastened to a stationary portion of a vehicle, the buffer head being driven into the socket by a small amount;
- the corresponding movable portion of the vehicle is closed for a first time on the stationary portion. This then gives rise to the buffer head subsequently being driven serration by serration into the socket until it reaches a self-adjusted position in which the buffer head is flush with the now-closed movable portion;
- the movable portion is opened and then the axial position of the buffer head in the socket is locked by the clamping action of the screw in the threaded shank of the buffer head; and
- a calibrated stop-engaging pad, e.g. in the form of a plug having a thickness of a few millimeters, is put into place on the movable portion of the vehicle in order to impart prestress between the self-adjustable stop and the pad.

Patent document U.S. Pat. No. 5,735,511 discloses a buffer device with a self-adjustable stop that enables such prestress to be imparted in a manner that is simpler and quicker.

With that known device, the step of putting the calibrated pad into place is eliminated by introducing prestress in the same operation as locking the axial position of the buffer head in the socket of the buffer device.

Nevertheless, that device presents the drawbacks firstly of being fastened by clamping and adhesion, which in the long run tends to become unfastened, and secondly of being made up of four distinct parts, giving rise to significant manufacturing costs.

SUMMARY

The invention provides a buffer device with a self-adjustable stop, the device comprising a buffer head in the form of a shank and a socket into which the buffer head in the form of a shank can be driven axially, the device further comprising an annular ring inserted axially in an axial bore of the socket and actuatable in turning to block the axial position of the buffer head in the socket, the ring comprising a bottom edge defining a thrust ramp designed, when the ring is caused to turn, for producing a cam effect with the axial bore in a counterbore in the end of the socket and enabling the buffer head to be raised. The device further includes the following features:

the shank of the buffer head presents along its entire length at least one flat, and adjacent to said at least one flat, at least one zone of touching ribs or grooves forming serrations;

the ring has an inside surface having at least one smooth longitudinal strip that extends axially, and at least one ribbed longitudinal strip that extends adjacent to the at least one smooth strip;

the shank of the buffer head is prevented from turning under the counterbore in the socket;

the outer annular surface of the ring is provided with a cam path defining a cam profile that co-operates with at least one cam follower finger provided on the top edge of the bore; and the ring and the shank of the buffer head are designed so that the ring has a first angular position in the socket in which the buffer head can be driven into the ring serration by serration, and a second angular position in which the buffer head is blocked in axial position in the ribs of the ring.

The buffer device with a self-adjustable stop may present the following features:

the shank of the buffer head may present along its entire length two diametrically opposite flats, and between the two flats, the touching ribs or grooves that form the serrations;

the ring may have an inner surface with two smooth longitudinal strips extending axially and two ribbed longitudinal strips extending between the smooth strips;

at least one of the two flats further includes at least one flexible tab presenting a projection with a serrated end designed to face the ribbed strips of the ring when the buffer head is driven into the ring;

the ring is actuatable by a turning movement of the quarter-turn type;

the ring includes a grip collar with lugs serving to indicate proper assembly;

the socket includes a bayonet type fastener system in order to be fastened on a flat support provided with a hole having slots; and the bayonet type fastener system may have axially-stepped radial fins in order to be adaptable to supports of different thicknesses.

With this arrangement, as soon as the ring has been turned about the shank of the buffer head, positive mechanical blocking occurs as a result of two opposing surfaces being put into contact in two distinct locations, namely between the serrations of the buffer head and the ribs of the ring, and between the cam path and the cam finger. This results in excellent long-term retention of the axial position of the buffer head in the socket without any risk of relative sliding, and this applies independently of the material from which the buffer head or the socket are made.

With this arrangement, the axial height of the buffer head in the socket can be adjusted very finely. More particularly, with the serration system, the adjustment height set during the first closure of the tailgate or hood is obtained with great accuracy. Thereafter, the extent to which the buffer head is raised is likewise set with great accuracy. This accuracy in setting height is obtained even if there is a certain amount of slack between the buffer head and the blocking ring. As a result, this accuracy in the "prestressing" makes it possible to obtain a good level of vibration damping when the vehicle hood, for example, is closed.

Unlike the device disclosed in patent U.S. Pat. No. 5,573,511, the device of the invention does not make use of blocking by flexing certain elements, where such blocking presents the drawback that after initial adjustment, the buffer head is subjected to internal stress even before the hood is closed for use of the buffer head as vibration-damping means. These internal stresses have the effect of reducing the fatigue strength of the part (its material becomes flattened over time and its thicknesses decreases, even if the hood is not closed). The buffer head is not subjected to continuous internal stress since mechanical stresses are applied only on closing the vehicle hood, for example.

BRIEF DESCRIPTION OF THE DRAWINGS

The present invention can be better understood and other advantages appear on reading the following description and the accompanying drawings, in which.

DESCRIPTION OF AN EMBODIMENT

Figure 1:
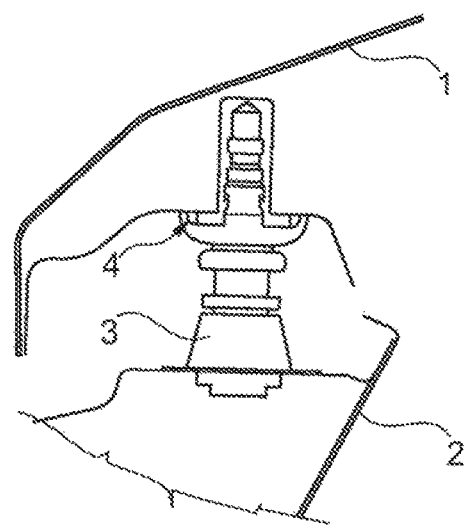
FIG. 1 is a very diagrammatic view of a buffer device with a self-adjustable stop for adjusting automatically to a gap between a stationary portion of a vehicle structure and a movable portion of the bodywork of the vehicle.

FIG. 1 shows a movable portion 1 of the bodywork of a vehicle, in this example the rear tailgate of the vehicle, which serves to close a stationary portion 2 of the vehicle, specifically the stationary portion of the rear trunk of the vehicle.

A self-adjustable stop 3 is mounted in this example on the stationary portion of the trunk 2, while an optional pad 4 for engaging the stop is mounted on the movable tailgate 1 to define a gap between the movable tailgate 1 and the stationary portion 2 of the vehicle trunk.

The pad 4 may be fastened to the trunk tailgate 1 by clip fastening or by analogous means. It may have a resilient head, e.g. made of elastomer, that comes into contact with a buffer head of the self-adjustable stop 3 when the tailgate 1 is closed.

Figure 2:
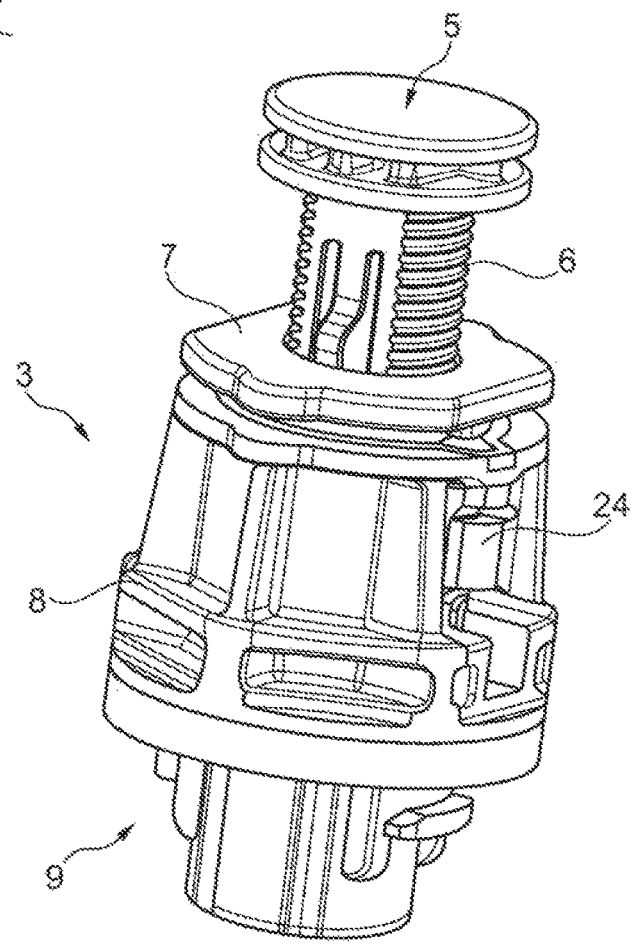
FIG. 2 is a perspective view of the buffer device with a self-adjustable stop.

In FIG. 2, the self-adjustable stop 3 has a buffer head 5 essentially in the form of a shank 6, the end of the buffer head possibly being made of a resilient material such as elastomer.

The buffer head 5 in FIG. 2 has a top end that constitutes the stop and in this example is disk-shaped, the shank 6 of the buffer head 5 extending perpendicularly under the disk.

In this example, the shank 6 is shown as being engaged in part in a ring 7 mounted inside a bore in a socket 8 constituting the body of the self-adjustable stop. The bottom portion 9 of the socket 8 forms a bayonet type fastening for fastening the self-adjustable stop, in this example to the stationary trunk portion 2.

Figure 3:
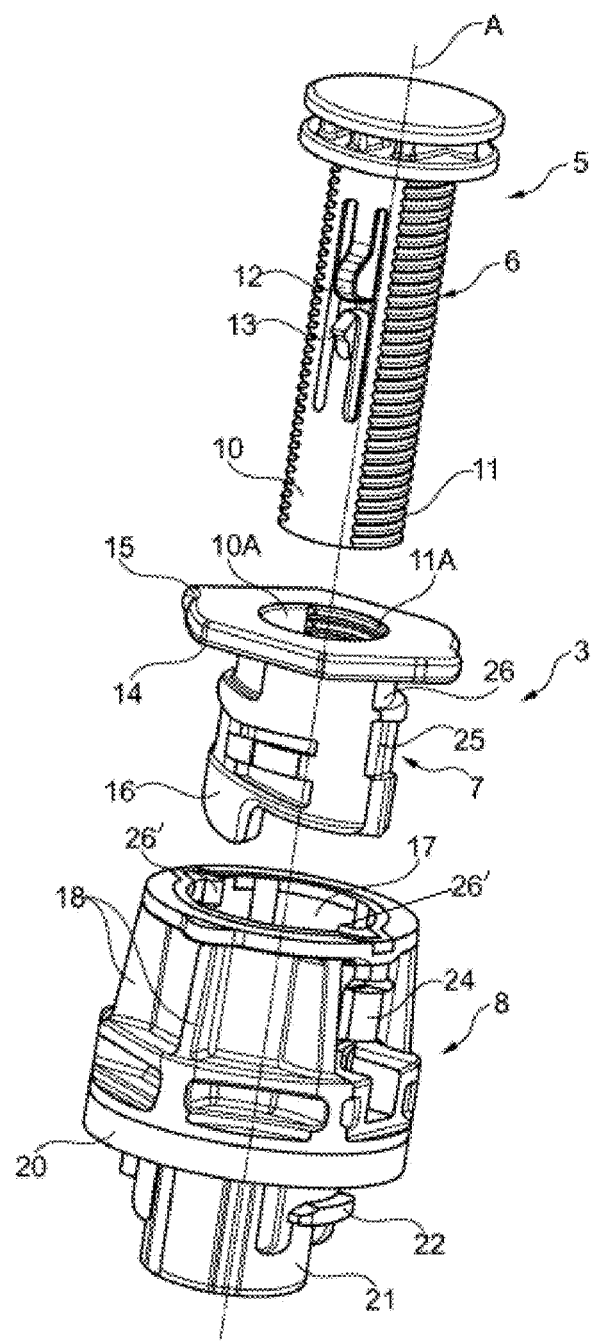
FIG. 3 is an exploded view of the component elements of the buffer device with a self-adjustable stop shown in FIG. 2.

FIG. 3 is an exploded view of the self-adjustable stop 3.

As can be seen in FIG. 3, the shank 6 of the buffer head 5 extends along an axial direction A.

The shank is in the form of a vertical cylindrical portion and it presents along its entire length at least one flat 10, and in this example two diametrically opposite flats 10 (only one being visible in FIG. 3).

Between the two opposite flats 10, the shank 6 has touching ribs or grooves 11 along its entire length forming serrations.

On one or on the two flats 10, there may be provided a first flexible tab 12 that forms a projection with a serrated end.

In addition, a second flexible tab 13 is provided, in this example under the tab 12, which second tab also presents a serrated end projection.

As can be seen in FIG. 3, the two tabs 12 and 13 are arranged in axial alignment and in opposite directions.

The ring 7 is essentially cylindrical in shape and it serves as a latch for blocking or locking the buffer head 5 in axial position in the socket 8.

On its top edge, it has a collar 14 for use in turning it by hand in the socket 8, with the collar 14 being gripped between two fingers.

The collar 14 may have two diametrically-opposite lugs 15 that serve to make it easy to operate and that also serve as indicators of proper assembly.

The ring 7 also has a bottom edge with a particular profile for the purpose of defining a thrust ramp 16 that co-operates in this example with an inner shoulder of the socket, as described below.

The ring 7 has a bore of oblong cross-section that extends along the axial direction A. This bore in the ring 7 has at least one smooth longitudinal strip 10A on its inside surface, there being two smooth longitudinal strips 10A in this example that extend along the direction A, and between these two strips 10A there are two other longitudinal strips 11A having ribs.

As can be seen from FIG. 3, the buffer head 5 is inserted in the ring 7 at an angular orientation such that the tabs 12 and 13 (and thus the flats 10) are facing the ribbed strips 11A of the ring and the ribs 11 of the buffer head are facing the smooth strips 10A of the ring.

As mentioned above, the socket 8 constitutes the body of the self-adjustable stop 3. It is in the form of a bushing with a bottom under the bushing.

The socket 8 has a substantially cylindrical axial bore 17 with the ring 7 being arranged coaxially therein.

As can be seen in FIG. 3, the structure of the socket 8 may be reinforced by radially-extending splines 18 arranged on the outer peripheral surface of the socket 8.

The middle portion 20 of the socket 8, which corresponds to the base of the bushing, is annular in shape and is made, by way of example, out of elastomer in order to form a sealing gasket.

Figure 7:
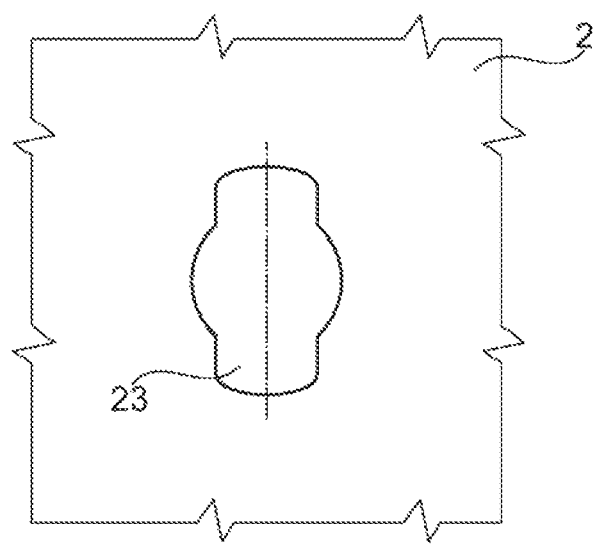
FIG. 7 shows a fastener hole with slots for fastening the buffer device as shown in FIGS. 1 to 6.

The bottom 21 of the socket 8 is provided with radially-extending fins 22 for forming a bayonet type fastener system suitable for fastening the socket 8 in a hole with slots 23, as shown in FIG. 7.

Flexible fingers (not shown in the figures) are arranged under the middle portion 20 to bear resiliently against the edge of the hole with slots 23, which means that the socket is fastened in the hole with slots by performing a push-and-turn movement.

Figure 4:
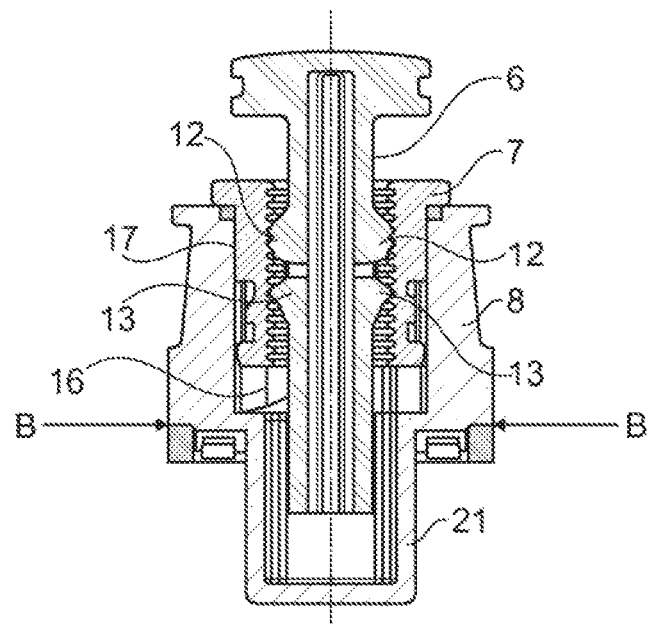
FIG. 4 is an axial section view of the FIG. 3 device in a first angular position of the ring in the socket.
Figure 5:
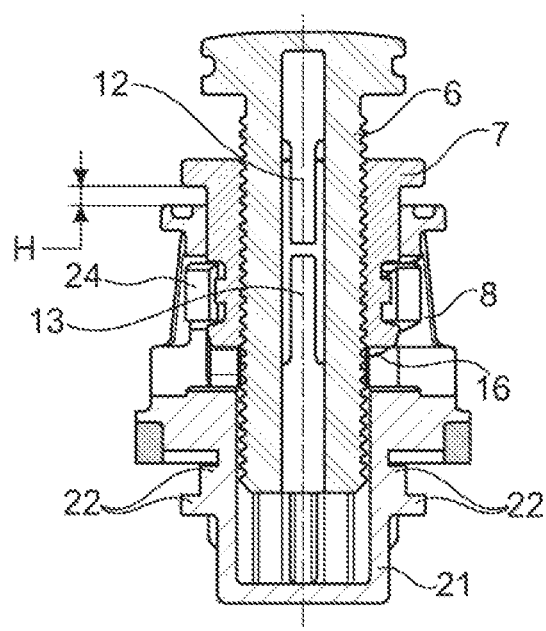
FIG. 5 is an axial section view of the FIG. 3 device in a second angular position of the ring in the socket.

In the example embodiment, prestress between the optional pad 4 shown in FIG. 1 and the self-adjustable stop 3 is obtained by raising the buffer head 5 (the shank 6) in the socket 8 while the ring 7 is being turned in the bore 17 of the socket 8 to lock the axial position of the buffer head 5 in the socket, as shown in FIGS. 4 and 5.

FIGS. 4 and 5 are axial section views of the buffer device respectively when the shank 6 of the buffer head is driven into the socket 8 (after the step of closing the movable tailgate onto the stationary portion of the trunk), and when the shank 6 is blocked in axial position in the socket.

As can be seen in FIG. 4, the bore 17 in the socket 8 presents a counterbore in which the ring 7 is located.

The bore 17 continues under the counterbore in the bottom portion 21 of the socket. This portion of the bore under the counterbore is in the shape of a portion of a cylinder of section complementary to the section of the shank 6.

Figure 6:
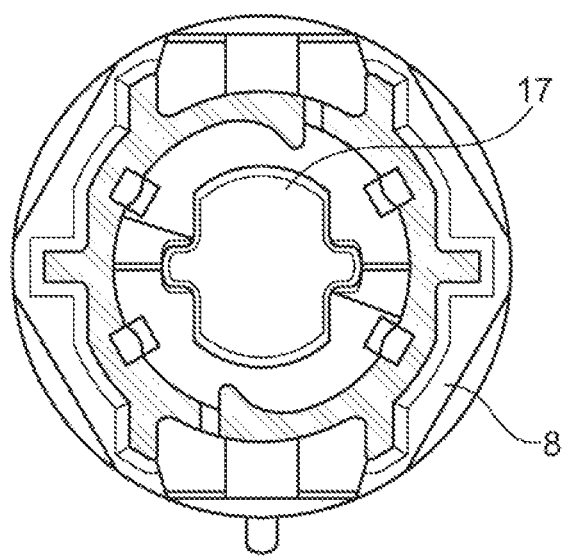
FIG. 6 is a cross-section view of the socket on section line BB of FIG. 4.

This portion of the bore 17 is shown in FIG. 6 in cross-section on section line B-B in FIG. 4. In this example, it has two diametrically opposite flats that ensure that when the shank 6 is inserted in this portion of the bore 17, as shown in FIG. 4, it is prevented from turning about the axis A.

With reference to FIG. 5, the ring 7 has been turned through a quarter-turn compared with FIG. 4, thus causing the serrations of the shank 6 to be engaged in the ribs 11A of the ring 7, the ring 7 having turned around the shank 6, which has remained stationary in rotation relative to the socket 8.

Simultaneously, the turning movement of the thrust ramp 16 at the base of the ring 7 has produced a cam effect against the end of the counterbore in the bore 17, causing the ring 7 to move axially upwards in translation within the socket 8, thereby causing the buffer head 5 to be raised through a height H relative to the socket 8.

The ring 7 may be locked in the angular position shown in FIG. 5, e.g. by means of a pawl 24 formed in the inside surface of the bore 17, this pawl engaging in a notch 25 formed in the outer surface of the ring 7, as shown in FIG. 3. It is possible to have two diametrically opposite pawls.

It can be seen in FIG. 3 that the outer annular surface of the ring 7 may be provided with cam paths such as 26 defining a cam profile identical to the thrust ramp 16 and co-operating with at least one cam-follower finger, there being two cam-follower fingers such as 26' in this example that are provided on the top edge of the bore 17.

In this example, the profile of the thrust ramp 16 or of the cam paths 26 is such that turning the ring 7 through a quarter-turn in the socket 8 gives rise to a calibrated axial movement (H) in translation 8 corresponding to the desired degree of raising, which may for example be 1.5 millimeters (mm).

Figure 8:
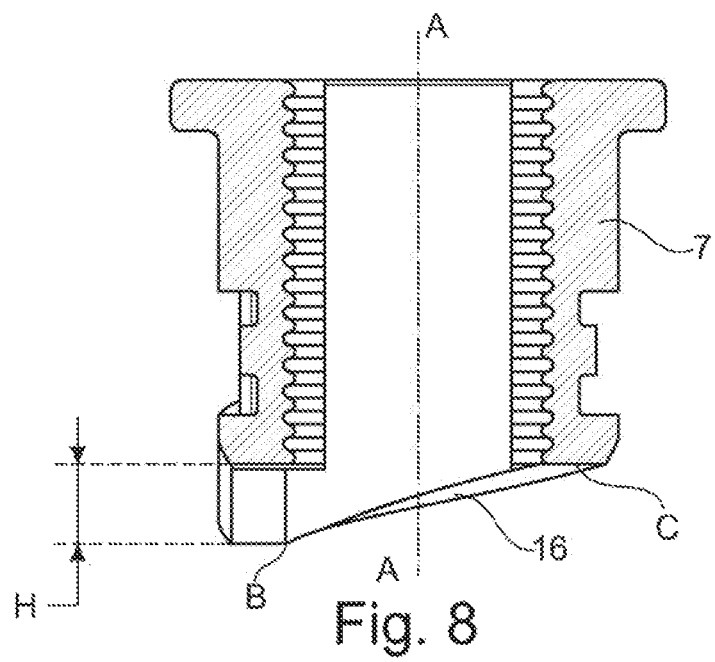
FIG. 8 shows an example profile for the thrust ramp on the ring.

FIG. 8 is an axial section view of the ring 7 showing a profile example for the raising ramp 16 provided at the bottom portion of the ring 7.

In this example, the profile is helical and extends over half of the perimeter of the annular bottom edge of the ring 7 between a low point B and a high point C.

Figure 9:
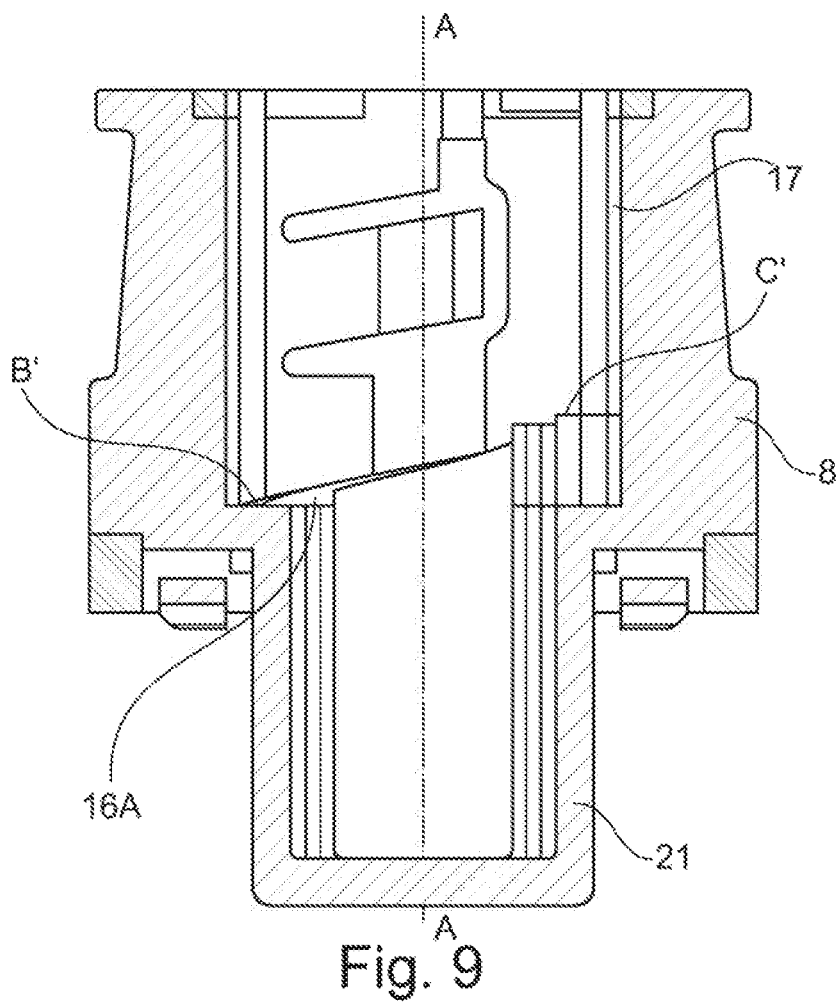
FIG. 9 shows the same profile for the thrust ramp on the socket in which the ring turns.

The bottom edge of the ring 7 moves over an annular shoulder in the socket 8, which shoulder is constituted by the end wall 16A of the counterbore in the bore 17, as shown in FIG. 9, this annular shoulder having a profile that is complementary to the profile of the raising ramp 16, this profile extending between a low point B' and a high point C'.

The raising height H in this example corresponds to the distance along the axis A between the low point B and the high point C of the helical ramp 16 when the ring 7 is turned through a quarter-turn in the socket 8 from a relative position of the ring 7 in the socket 8 in which the low points B and B' and the high points C and C' of the profiles 16 and 16A coincide respectively, to a relative position in which the low point B of the profile 16 coincides with the high point C' of the profile 16A.

In a variant, it is possible to have a profile for the thrust ramp and for the cam that enable the buffer head to be raised several times consecutively. For example, it is possible to raise it a first time by turning the ring through a first quarter-turn, and then to raise it a second time by subsequently turning the ring 7 through another quarter-turn in the socket 8.

Advantageously, using the above arrangement, when the ring 7 has turned through a quarter-turn, the locking of the axial position of the buffer head 5 in the socket 8 is terminated and simultaneously the raising movement in axial translation of the buffer head is complete, with this termination of movement being marked by the pawl 24 engaging in the notch 25.

Furthermore, in this position of locking the ring 7 in the socket 8, provision can be made for the lug 15 of the collar 14 of the ring 7 to be in alignment with the corresponding slot provided in the top edge of the socket 8, as shown in FIG. 2, thereby indicating that the buffer head has been properly mounted and properly locked in the raised position in the socket 8.

As mentioned above, the bottom 21 of the socket 8 has fins 22 that are stepped along the axial direction A.

FIG. 5 shows more particularly fins 22 that are diametrically opposite about the axis A. These fins 22 are dimensioned so as to pass through the slots 23 in the hole. Nevertheless, as visible in FIG. 5, each fin 22 forms two shoulders that are stepped in the axial direction, that are radially offset, and that enable the socket 8 to be fastened on supports of different thicknesses, typically on a support made of sheet metal having thickness of about 0.67 mm to 0.7 mm, and on a support made of plastics material having thickness of about 3 mm.

The various steps of assembling a self-adjustable stop 3 with raising of the buffer head are described below with reference to FIG. 1 for the purpose of spacing a first component 1 of the tailgate, trunk, flap, or other movable type of bodywork portion of a motor vehicle apart from a second component 2 of the type constituting a stationary portion of the body of the vehicle, with a gap that is constant, and also for the purpose of obtaining a damping effect when the first component is closed against the second component.

In the example embodiment, the socket 8 of the stop 3 is fastened on the second component 2, for example, using a bayonet type fastener system, the shank 6 of the stop being driven a short distance into the socket 8, e.g. down to the level of the projections of the tabs 12, as shown in FIG. 2.

The first component 1 is then moved towards the second component 2 so as to drive the shank 6 by successive serrations into the socket 8 until it occupies a position where it is flush with the second component.

The first component is then moved away from the second component.

The shank 6 is raised in the socket 8 by acting on the blocking means 7 that block the shank 6 in the socket 8, e.g. by turning through a quarter-turn.

The first component 1 may then be closed again onto the second component, with prestress then being introduced by the effect of the buffer shank being raised in the socket 8.

The buffer device with self-adjustable stop thus contributes to simplifying the process of assembling a self-adjustable stop between two components as described above. Furthermore, the buffer device with self-adjustable stop contributes to reducing the overall time needed for performing such assembly.

It is also possible to provide for the thrust ramp 16 to be constituted by helical ribs on the shank 6 and on the bore 17. It is also possible to raise the buffer head by means of a spacer constituting a wedge that is engaged transversely in the socket 8, the spacer also serving as means for blocking the axial position of the buffer head in the socket 8.

It should be understood that the various elements 5, 7, 8, and 9 of the self-adjustable stop 3 may be made by molding a plastics material and that such a self-adjustable stop can be fabricated at low cost. These elements could also be fabricated by adding material in a three-dimensional (3D) printer, e.g. if only a few devices are to be fabricated.

The invention claimed is:

1. A buffer device with a self-adjustable stop, the device comprising a buffer head in the form of a shank and a socket into which said buffer head in the form of a shank can be driven axially, the device further comprising an annular ring inserted axially in an axial bore of said socket and actuatable in turning to block the axial position of said buffer head in said socket, said ring comprising a bottom edge defining a thrust ramp designed, when said ring is caused to turn, for producing a cam effect with said axial bore in a counterbore in the end of said socket and enabling said buffer head to be raised, wherein said shank of said buffer head presents along its entire length at least one flat, and adjacent to said at least one flat, at least one zone of touching ribs or grooves forming serrations;

said ring has an inside surface having at least one smooth longitudinal strip that extends axially, and at least one ribbed longitudinal strip that extends adjacent to the at least one said smooth strip;

said shank of said buffer head is prevented from turning under said counterbore in said socket;

the outer annular surface of said ring is provided with a cam path defining a cam profile that co-operates with at least one cam follower finger provided on the top edge of said bore; and said ring and said shank of said buffer head are designed to interact together so that said ring has a first angular position in said socket in which said buffer head can be driven into said ring serration by serration, and a second angular position in which said buffer head is blocked in axial position in said ribs of said ring.

2. A buffer device with a self-adjustable stop according to claim 1, wherein said shank of said buffer head presents along its entire length two diametrically opposite flats, and between said two flats, said touching ribs or grooves that form said serrations.

3. A buffer device with a self-adjustable stop according to claim 1, wherein said ring has an inner surface with two smooth longitudinal strips extending axially and two ribbed longitudinal strips extending between said smooth strips.

4. A buffer device with a self-adjustable stop according to claim 1, wherein at least one of said two flats further includes at least one flexible tab presenting a projection with a serrated end designed to face said ribbed strips of said ring when said buffer head is driven into said ring.

5. A buffer device with a self-adjustable stop according to claim 1, wherein said ring is actuatable by a turning movement of the quarter-turn type.

6. A buffer device with a self-adjustable stop according to claim 1, wherein said ring includes a grip collar with lugs serving to indicate proper assembly.

7. A buffer device with a self-adjustable stop according to claim 1, wherein said socket includes a bayonet type fastener system.

8. A buffer device with a self-adjustable stop according to claim 7, wherein said bayonet type fastener system has axially-stepped radially-extending fins.

\* \* \* \* \*